(12) United States Patent  
Bito (10) Patent No.: US 9,809,224 B2  
(45) Date of Patent: Nov. 7, 2017

(54) BATTERY CHARGE/DISCHARGE CONTROL APPARATUS

(71) Applicant: SUZUKI MOTOR CORPORATION, Hamatsu-shi, Shizuoka (JP)

(72) Inventor: Seiji Bito, Hamamatsu (JP)

(73) Assignee: SUZUKI MOTOR CORPORATION, Hamamatsu-Shi (JP)

( * ) Notice: Subject to any disclaimer, the term of this patent is extended or adjusted under 35 U.S.C. 154(b) by 210 days.

(21) Appl. No.: 14/248,077

(22) Filed: Apr. 8, 2014

(65) Prior Publication Data

US 2014/0309824 A1    Oct. 16, 2014

(30) Foreign Application Priority Data

Apr. 11, 2013 (JP) ................................. 2013-082879

(51) Int. Cl.
   *B60W 30/184*    (2012.01)
   *B60W 10/08*     (2006.01)
   (Continued)

(52) U.S. Cl.
   CPC .......... *B60W 30/184* (2013.01); *B60K 6/445* (2013.01); *B60W 10/08* (2013.01); *B60W 10/26* (2013.01);
   (Continued)

(58) Field of Classification Search
   CPC  B60W 20/106–20/1062; B60W 10/26; B60W 30/184; B60W 10/08; B60W 20/50;
   (Continued)

(56) References Cited

U.S. PATENT DOCUMENTS 6,018,694 A * 1/2000 Egami .................... B60K 6/24  
                                                    180/65.23  
2001/0035742 A1 * 11/2001 Ito ...................... B60W 10/26  
                                                    320/157  
(Continued)

FOREIGN PATENT DOCUMENTS

CN          101961983 A       2/2011  
CN          103001429 A       3/2013  
(Continued)

OTHER PUBLICATIONS

Chinese Office Action dated Nov. 3, 2015, issued to Chinese Application No. 201410143044.X.  
(Continued)

*Primary Examiner* — Courtney Heinle  
(74) *Attorney, Agent, or Firm* — Stein IP, LLC (57) ABSTRACT

A battery charge/discharge control apparatus for controlling charge/discharge of a battery in a vehicle as defined herein, includes: a battery control portion which is provided for controlling charge/discharge of the battery; a vehicle control portion which controls the inverter and the engine and controls the charge/discharge of the battery based on information from the battery control portion; a failure determination portion which determines whether there is a failure in the battery control portion or not; and an inverter driving state detection portion which detects a driving state of the inverter; wherein: the vehicle control portion controls the charge/discharge of the battery based on the driving state of the inverter detected by the inverter driving state detection portion when the failure determination portion determines that there is a failure in the battery control portion.

7 Claims, 9 Drawing Sheets

(51) Int. Cl.
*B60W 10/26* (2006.01)
*B60K 6/445* (2007.10)
*B60W 20/50* (2016.01)

(52) U.S. Cl.
CPC .......... *B60W 20/50* (2013.01); *Y02T 10/6239* (2013.01); *Y02T 10/7005* (2013.01); *Y02T 10/7241* (2013.01); *Y02T 90/14* (2013.01); *Y10S 903/93* (2013.01)

(58) Field of Classification Search
CPC ............. Y10S 903/903; Y10S 903/907; Y10S 903/93; Y02T 10/7005–10/7016; Y02T 10/7038–10/7066; Y02T 10/7241; Y02T 90/14; Y02T 10/6239; B60K 6/445
USPC .......................................................... 701/22
See application file for complete search history.

(56) References Cited

U.S. PATENT DOCUMENTS

| | | | |
|---|---|---|---|
| 2002/0003417 A1* | 1/2002 | Bito | B60K 6/48 320/152 |
| 2002/0060551 A1* | 5/2002 | Ikeda | B60L 11/1851 320/104 |
| 2006/0208708 A1* | 9/2006 | Ishishita | G01R 31/3658 320/166 |
| 2010/0108417 A1* | 5/2010 | Gilmore | B60K 6/448 180/65.51 |
| 2011/0199051 A1* | 8/2011 | Shimizu | H02J 7/0016 320/116 |
| 2011/0199115 A1* | 8/2011 | Iida | B60L 3/0046 324/764.01 |
| 2011/0213524 A1* | 9/2011 | Matsumoto | B60L 11/187 701/22 |
| 2011/0320082 A1* | 12/2011 | Ishishita | B60K 6/445 701/22 |
| 2012/0185120 A1* | 7/2012 | Miyazaki | B60L 1/003 701/22 |
| 2013/0060497 A1* | 3/2013 | Bito | G01R 31/361 702/63 |
| 2013/0085657 A1* | 4/2013 | Bito | F02N 11/0825 701/112 |
| 2013/0106350 A1* | 5/2013 | Ono | H01M 10/44 320/109 |
| 2013/0141953 A1* | 6/2013 | Nakamura | B60L 3/0038 363/74 |
| 2013/0200845 A1* | 8/2013 | Bito | H02J 7/0042 320/109 |
| 2013/0226377 A1* | 8/2013 | Stanek | H02J 7/0047 701/22 |
| 2014/0210414 A1* | 7/2014 | Kamata | H02J 7/0021 320/118 |
| 2014/0285210 A1* | 9/2014 | Kanzaki | B60L 11/1851 324/503 |
| 2015/0159346 A1* | 6/2015 | Kim | E02F 9/2091 701/22 |

FOREIGN PATENT DOCUMENTS

| | | |
|---|---|---|
| EP | 1 209 021 A2 | 5/2002 |
| EP | 1 209 021 A3 | 7/2002 |
| JP | 3185674 B2 | 5/2001 |
| JP | 4311363 B2 | 8/2009 |
| JP | 4595829 B2 | 12/2010 |
| WO | WO 2012/039258 A1 | 3/2012 |

OTHER PUBLICATIONS

Chinese Office Action dated Jul. 12, 2016, issued by the Chinese Patent Office in corresponding application CN 201410143044.X.

* cited by examiner

| ELECTROMOTIVE VOLTAGE (V) | ESTIMATED SOC (%) | CHARGE/DISCHARGE CONTROL AMOUNT ON CHARGE SIDE | CHARGE/DISCHARGE CONTROL AMOUNT ON DISCHARGE SIDE |
|---|---|---|---|
| 200 | 0 | 8 | 0 |
| 207 | 10 | 8 | 1 |
| 212 | 20 | 8 | 2 |
| 214 | 30 | 8 | 4 |
| 217 | 40 | 8 | 8 |
| 219 | 50 | 8 | 8 |
| 222 | 60 | 8 | 8 |
| 223 | 70 | 4 | 8 |
| 226 | 80 | 2 | 8 |
| 229 | 90 | 1 | 8 |
| 237 | 100 | 0 | 8 |

BATTERY CHARGE/DISCHARGE CONTROL APPARATUS

CROSS-REFERENCE TO RELATED APPLICATIONS

This application claims the benefit of Japanese Patent Application JP 2013-082879, filed Apr. 11, 2013, the entire content of which is hereby incorporated by reference, the same as if set forth at length.

FIELD OF THE INVENTION

The present invention relates to a technique for controlling charge/discharge of a battery serving as a motive power source for vehicle traveling.

BACKGROUND OF THE INVENTION

Electric vehicles (EV), hybrid electric vehicles (HEV) and plug-in hybrid electric vehicles (PHEV) have been heretofore provided with a battery, a drive motor, a driving inverter, and a battery controller (which may be also referred to as EV controller) for detecting the state (including an SOC (State Of Charge) value, a temperature, etc.) of the battery. Some hybrid electric vehicles may have an engine, a power generation motor, a power generation inverter, a power distribution mechanism, etc.

Such an electric vehicle or the like controls the driving states of the motor, the inverter, etc. for the charge/discharge control of the battery based on the state of the battery detected by the battery controller.

Techniques about the charge/discharge control of a battery have been disclosed in Japanese Patent No. 3185674, Japanese Patent No. 4595829 and Japanese Patent No. 4311363. An apparatus disclosed in Japanese Patent No. 3185674 limits the SOC. An apparatus disclosed in Japanese Patent No. 4595829 limits the battery temperature. An apparatus disclosed in Japanese Patent No. 4311363 limits a failure.

SUMMARY OF THE INVENTION

However, the state (including the SOC value, the temperature, etc.) of the battery cannot be determined when there is a failure in the battery controller. Therefore, when the charge/discharge control of the battery is kept on in this situation, there is a fear that the battery may be charged/discharged excessively.

An object of the invention is to prevent a battery from being charged/discharged excessively when there is a failure in a battery controller which detects the state of the battery.

Means for Solving Problem

A configuration (1) of the present invention provides a battery charge/discharge control apparatus for controlling charge/discharge of a battery in a vehicle including the battery serving as a motive power source for driving the vehicle, an inverter which performs conversion between a DC current and an AC current, a drive motor which is driven by electric power supplied from the battery through the inverter and transmits a driving force to driving wheels, and a power generation motor which is rotated by an engine to generate electric power and supplies the generated electric power to the battery through the inverter, the battery charge/discharge control apparatus comprising: a battery control portion which is provided for controlling charge/discharge of the battery; a vehicle control portion which controls the inverter and the engine and controls the charge/discharge of the battery based on information from the battery control portion; a failure determination portion which determines whether there is a failure in the battery control portion or not; and an inverter driving state detection portion which detects a driving state of the inverter; wherein: the vehicle control portion controls the charge/discharge of the battery based on the driving state of the inverter detected by the inverter driving state detection portion when the failure determination portion determines that there is a failure in the battery control portion.

In a configuration (2) of the present invention, it is preferable that the battery control portion outputs, to the vehicle control portion, a charge/discharge control amount for controlling the charge/discharge of the battery; the battery charge/discharge control apparatus further comprises a failure-time discharge control amount calculation portion which calculates the charge/discharge control amount based on a voltage value of a current flowing in the inverter, which value is detected by the inverter driving state detection portion; and the vehicle control portion controls the charge/discharge of the battery based on the charge/discharge control amount supplied from the battery control portion when the failure determination portion determines that there is no failure in the battery control portion, and controls the charge/discharge of the battery based on the charge/discharge control amount calculated by the failure-time discharge control amount calculation portion when the failure determination portion determines that there is a failure in the battery control portion.

In a configuration (3) of the present invention, it is preferable that the battery control portion outputs, to the vehicle control portion, a charge/discharge control amount for controlling the charge/discharge of the battery; the battery charge/discharge control apparatus further comprises a charge/discharge amount estimation portion which estimates a charge/discharge amount of the battery from driving states of the drive motor and the power generation motor, an electromotive voltage calculation portion which calculates an electromotive voltage of the battery based on the charge/discharge amount of the battery estimated by the charge/discharge amount estimation portion and a voltage value of a current flowing in the inverter, which value is detected by the inverter driving state detection portion, and a failure-time discharge control amount calculation portion which calculates the charge/discharge control amount based on the electromotive voltage calculated by the electromotive voltage calculation portion; and the vehicle control portion controls the charge/discharge of the battery based on the charge/discharge control amount supplied from the battery control portion when the failure determination portion determines that there is no failure in the battery control portion, and controls the charge/discharge of the battery based on the charge/discharge control amount calculated by the failure-time discharge control amount calculation portion when the failure determination portion determines that there is a failure in the battery control portion.

In a configuration (4) of the present invention, it is preferable that the battery control portion outputs, to the vehicle control portion, a charge/discharge control amount for controlling the charge/discharge of the battery; the battery charge/discharge control apparatus further comprises a storage portion storing information in which a current value of a current supplied from the battery in order to drive a cooling fan of the battery has been associated with a temperature of the battery, and a failure-time discharge control amount calculation portion which refers to the information stored in the storage portion to acquire the current value corresponding to a temperature of the battery estimated when the cooling fan is driven in a predetermined driving state and which calculates the charge/discharge control amount based on the acquired current value; and the vehicle control portion controls the charge/discharge of the battery based on the charge/discharge control amount supplied from the battery control portion when the failure determination portion determines that there is no failure in the battery control portion, and controls the charge/discharge of the battery based on the charge/discharge control amount calculated by the failure-time discharge control amount calculation portion when the failure determination portion determines that there is a failure in the battery control portion.

In a configuration (5) of the present invention, it is preferable that the battery control portion outputs, to the vehicle control portion, a charge/discharge control amount for controlling the charge/discharge of the battery; the battery charge/discharge control apparatus further comprises a charge/discharge amount estimation portion which estimates a charge/discharge amount of the battery from driving states of the drive motor and the power generation motor, an electromotive voltage calculation portion which calculates an electromotive voltage of the battery based on the charge/discharge amount of the battery estimated by the charge/discharge amount estimation portion and a voltage value of a current flowing in the inverter, which value is detected by the inverter driving state detection portion, a storage portion storing information in which a current value of a current flowing from the battery to a cooling fan of the battery has been associated with a temperature of the battery, and at least two failure-time discharge control amount calculation portions selected from a first failure-time discharge control amount calculation portion which calculates the charge/discharge control amount based on the voltage value of the current flowing in the inverter, which value is detected by the inverter driving state detection portion, a second failure-time discharge control amount calculation portion which calculates the charge/discharge control amount based on the electromotive voltage calculated by the electromotive voltage calculation portion, and a third failure-time discharge control amount calculation portion which refers to the information stored in the storage portion to acquire the current value corresponding to a temperature of the battery estimated when the cooling fan is driven in a predetermined driving state, and which calculates the charge/discharge control amount based on the acquired current value; and the vehicle control portion controls the charge/discharge of the battery based on the charge/discharge control amount supplied from the battery control portion when the failure determination portion determines that there is no failure in the battery control portion, and controls the charge/discharge of the battery based on a charge/discharge control amount whose absolute value is the smallest, of the charge/discharge control amounts calculated by at least two failure-time discharge control amount calculation portions selected from the first to third failure-time discharge control amount calculation portions, when the failure determination portion determines that there is a failure in the battery control portion.

In a configuration (6) of the present invention, it is preferable that traveling of the vehicle is started and terminated by turning ON and OFF a power supply; and the battery charge/discharge control apparatus further comprises a vehicle prohibition determination portion which prohibits the drive motor from being driven so as to prohibit the vehicle from traveling when the failure determination portion determines that there is a failure in the battery control portion as soon as the power supply is turned from OFF to ON.

According to the configuration (1) of the invention, the battery charge/discharge control apparatus controls the charge/discharge of the battery based on the driving state of the inverter when there is a failure in the battery control portion. Thus, the battery charge/discharge control apparatus can control the charge/discharge of the battery properly even at failure in the battery control portion. It is therefore possible to prevent the battery from being charged/discharged excessively at failure in the battery control portion, so that the battery can be prevented from being damaged.

According to the configuration (2) of the invention, the battery charge/discharge control apparatus calculates the charge/discharge control amount based on the voltage value of the current flowing in the inverter. Accordingly, the battery charge/discharge control apparatus can control the charge/discharge of the battery properly even at failure in the battery control portion. It is therefore possible to prevent the battery from being charged/discharged excessively at failure in the battery control portion, so that the battery can be prevented from being damaged.

According to the configuration (3) of the invention, the battery charge/discharge control apparatus calculates the charge/discharge control amount based on the electromotive voltage of the battery. Accordingly, the battery charge/discharge control apparatus can control the charge/discharge of the battery properly even at failure in the battery control portion. It is therefore possible to prevent the battery from being charged/discharged excessively at failure in the battery control portion, so that the battery can be prevented from being damaged.

According to the configuration (4) of the invention, the battery charge/discharge control apparatus calculates the charge/discharge control amount based on the current value of the current flowing from the battery to the cooling fan of the battery corresponding to the battery temperature estimated when the cooling fan is driven in the predetermined driving state. Thus, the battery charge/discharge control apparatus can control the charge/discharge of the battery properly even at failure in the battery control portion. It is therefore possible to prevent the battery from being charged/discharged excessively at failure in the battery control portion, so that the battery can be prevented from being damaged. Further, the battery charge/discharge control apparatus can prevent the temperature of the battery from increasing excessively.

According to the configuration (5) of the invention, the battery charge/discharge control apparatus can calculate a plurality of charge/discharge control amounts and select one from the calculated charge/discharge control amounts. Accordingly, the battery charge/discharge control apparatus can control the charge/discharge of the battery based on a more proper charge/discharge control amount.

According to the configuration (6) of the invention, the battery charge/discharge control apparatus can prohibit the vehicle from traveling when there is a failure in the battery control portion. It is therefore possible to prohibit use of the vehicle from being kept on when there is a failure in the battery control portion.

REFERENCE SIGNS LIST 1 hybrid electric vehicle, 2 engine, 5 power generation motor, 6 drive motor, 7 inverter, 8 battery pack, 9 battery cooling fan, 10 battery controller, 15 inverter DC voltage sensor, 20 vehicle controller, 22 charge/discharge control portion, 23 failure determination portion, 30 charge/discharge control amount calculation portion, 33 inverter DC voltage calculation portion, 34 battery power estimation portion, 35, 36, 37 first to third charge/discharge control amount calculation portions, 38 charge/discharge control amount selection portion

DETAILED DESCRIPTION OF THE INVENTION

An embodiment of the invention will be described with reference to the drawings.

A hybrid electric vehicle will be used by way of example in the embodiment.

(Configuration)

Figure 1:
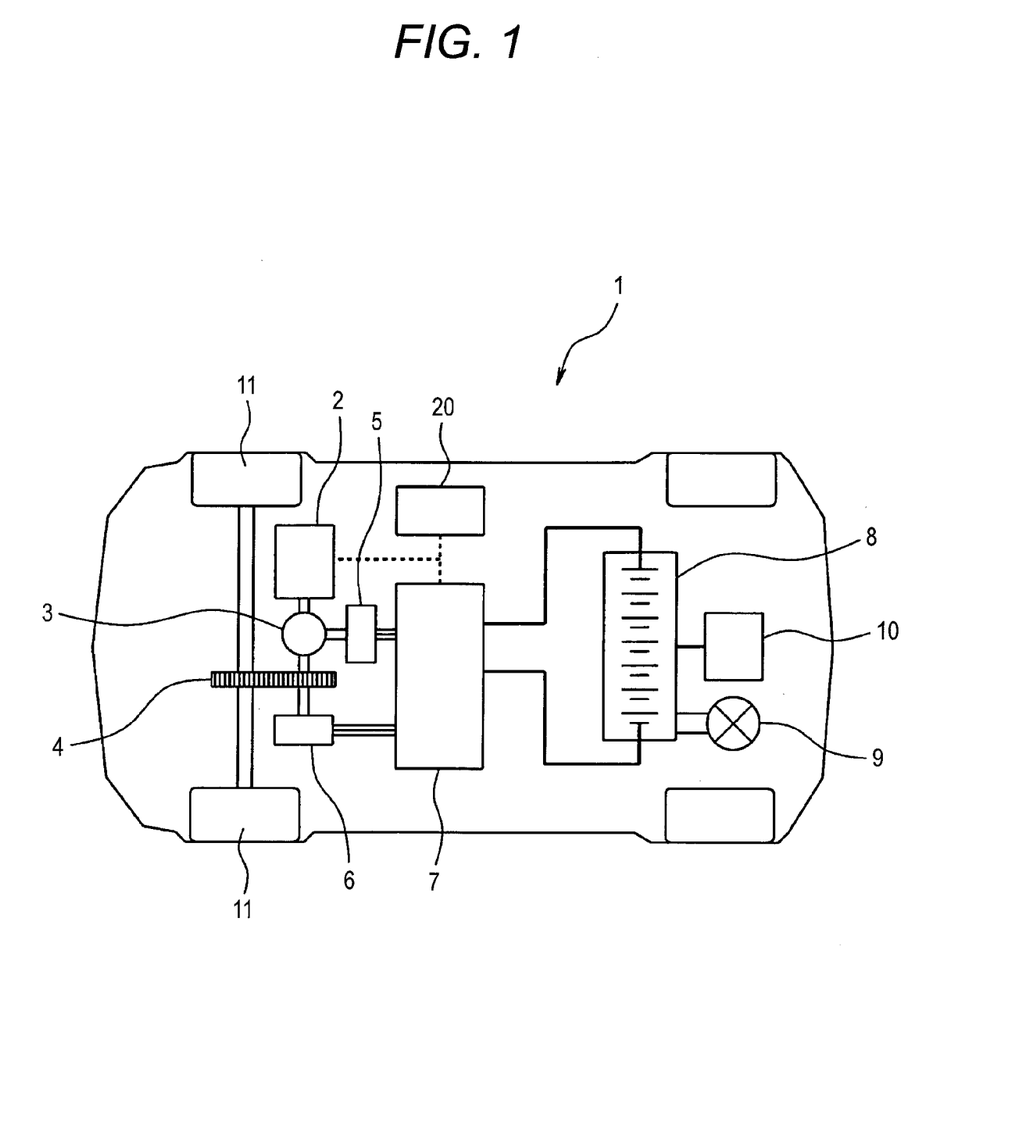
FIG. 1 is a diagram showing a configuration example of a hybrid electric vehicle according to an embodiment of the invention.

FIG. 1 shows a configuration example of a hybrid electric vehicle 1 according to the embodiment.

As shown in FIG. 1, the hybrid electric vehicle 1 has an engine 2, a power distribution device 3, a final gear (also referred to as differential gear) 4, a power generation motor 5, a drive motor 6, an inverter (also referred to as inverter generator) 7, a battery pack 8, a battery cooling fan 9, a battery controller (also referred to as battery monitoring unit) 10, and a vehicle controller 20.

The engine 2 is, for example, an internal combustion engine. Driving the engine 2 is controlled by the vehicle controller 20. The engine 2 is connected to the power distribution device 3.

The power distribution device 3 is a device by which the connection destination of the engine 2 can be selected from the final gear 4 and the power generation motor 5. The selection made by the power distribution device 3 is controlled by the vehicle controller 20.

The power generation motor 5 which is connected to the engine 2 by the power distribution device 3 functions as either a generator for converting the power of the engine 2 into electricity or a starter for starting the engine 2. When the power generation motor 5 functions as the generator or the starter, the power generation motor 5 transfers electric power to or from the battery pack 8 through the inverter 7. Driving the power generation motor 5 is controlled by the vehicle controller 20.

By the inverter 7, an electric current from the battery pack 8 is converted from DC to AC and supplied to the power generation motor 5 (the power generation motor 5 at the time of engine start) or the drive motor 6. In addition, by the inverter 7, an electric current from the power generation motor 5 (the power generation motor 5 functioning as a generator) is converted from AC to DC and supplied to the battery pack 8. Driving the inverter 7 is controlled by the vehicle controller 20.

The battery pack 8 includes a plurality of battery cells or modules. The battery pack 8 charges and discharges the drive motor 6 or the power generation motor 5 through the inverter 7.

The battery controller 10 is a controller for controlling the charge and discharge of the battery pack 8. Specifically, the battery controller 10 detects the state of the battery pack 8. The state of the battery pack 8 mentioned herein includes the current value of the battery pack 8, the voltage value of the battery pack 8, the temperature of the battery pack 8, the SOC value of the battery pack 8, the failure of the battery pack 8, etc. The battery controller 10 outputs the detected values to the vehicle controller 20.

In addition, the battery controller 10 calculates a charge/discharge control amount (also referred to as charge/discharge limiting value, limit power, etc.) in accordance with the current value of the battery pack 8, the voltage value of the battery pack 8, the temperature of the battery pack 8, the SOC value of the battery pack 8, the failure state of the battery pack 8, etc. The charge/discharge control amount herein is a value for controlling (and also limiting) the charge and discharge of the battery. That is, the charge/discharge control amount is a value indicating the power with which the battery pack 8 may be charged or discharged currently. The battery controller 10 outputs the calculated charge/discharge control amount to the vehicle controller 20.

The battery cooling fan 9 is driven by electric power supplied from the battery pack 8, so as to cool the battery pack 8. The battery cooling fan 9 is controlled by the vehicle controller 20.

The drive motor 6 is linked to driving wheels 11 through the final gear 4. The drive motor 6 is driven by electric power supplied from the battery pack 8 at the time of powering (EV traveling time). Thus, the drive motor 6 drives the driving wheels 11. On the other hand, at the time of regeneration, the drive motor 6 functions as a generator and supplies electric power to the battery pack 8. Driving the drive motor 6 is controlled by the vehicle controller 20.

The vehicle controller 20 performs various controls on the vehicle. The vehicle controller 20 is, for example, arranged in a microcomputer and an ECU (Electric Control Unit) including peripheral circuits of the microcomputer. To this end, for example, the vehicle controller 20 is constituted by a CPU, a ROM, a RAM, etc. One or two or more programs are stored in the ROM. The CPU executes various processes in accordance with the one or two or more programs stored in the ROM.

In the embodiment, on a normal occasion in which there is no failure in the battery controller 10, the vehicle controller 20 controls driving various devices including the power generation motor 5, the drive motor 6, the inverter 7, etc. to thereby control the charge/discharge of the battery pack 8, based on the charge/discharge control amount transmitted from the battery controller 10. When there is a failure in the battery controller 10, the vehicle controller 20 itself calculates the charge/discharge control amount. Based on the calculated charge/discharge control amount, the vehicle controller 20 controls driving the various devices including the power generation motor 5, the drive motor 6, the inverter 7, etc. to thereby control the charge/discharge of the battery pack 8.

Figure 2:
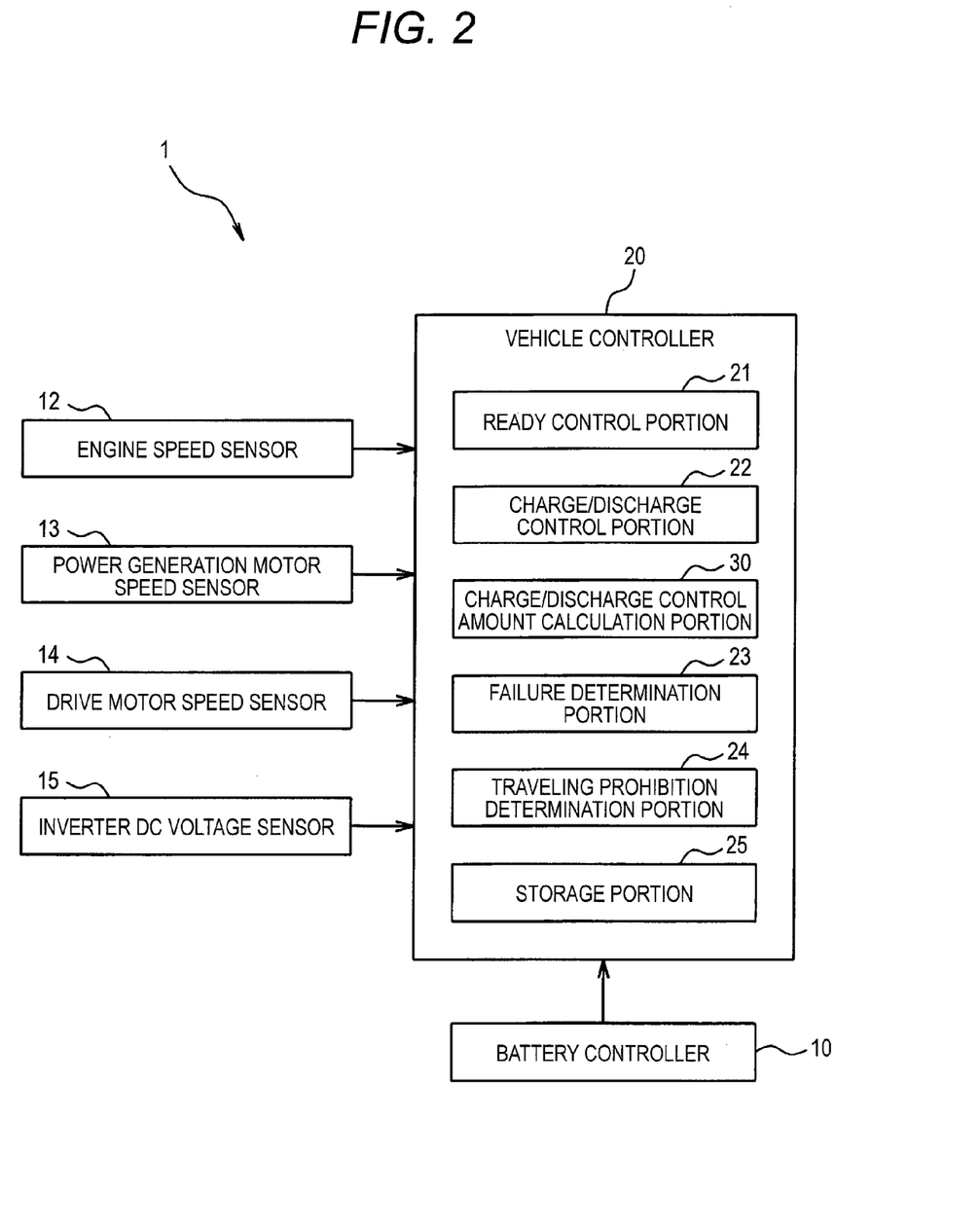
FIG. 2 is a block diagram showing a configuration example in a hybrid electric vehicle in which the charge/discharge of a battery pack can be controlled even at failure in a battery controller.

FIG. 2 shows an example of a configuration for such charge/discharge control in the hybrid electric vehicle 1.

As shown in FIG. 2, the hybrid electric vehicle 1 has an engine speed sensor 12, a power generation motor speed sensor 13, a drive motor speed sensor 14, and an inverter DC voltage sensor 15. The engine speed sensor 12 herein detects the number of rotations of the engine 2. The engine speed sensor 12 outputs the detected value to the vehicle controller 20. The power generation motor speed sensor 13 detects the number of rotations of the power generation motor 5. The power generation motor speed sensor 13 outputs the detected value to the vehicle controller 20. The drive motor speed sensor 14 detects the number of rotations of the drive motor 6. The drive motor speed sensor 14 outputs the detected value to the vehicle controller 20. The inverter DC voltage sensor 15 detects the DC voltage flowing into the inverter 7, that is, the voltage of the DC current supplied from the battery pack 8. The inverter DC voltage sensor 15 outputs the detected value to the vehicle controller 20.

In addition, as shown in FIG. 2, the vehicle controller 20 has a READY control portion 21, a charge/discharge control portion 22, a charge/discharge control amount calculation portion 30, a failure determination portion 23, a traveling prohibition determination portion 24, and a storage portion 25. Various data including a table etc. the vehicle controller 20 can use for processing are stored in the storage portion 25 herein.

Figure 3:
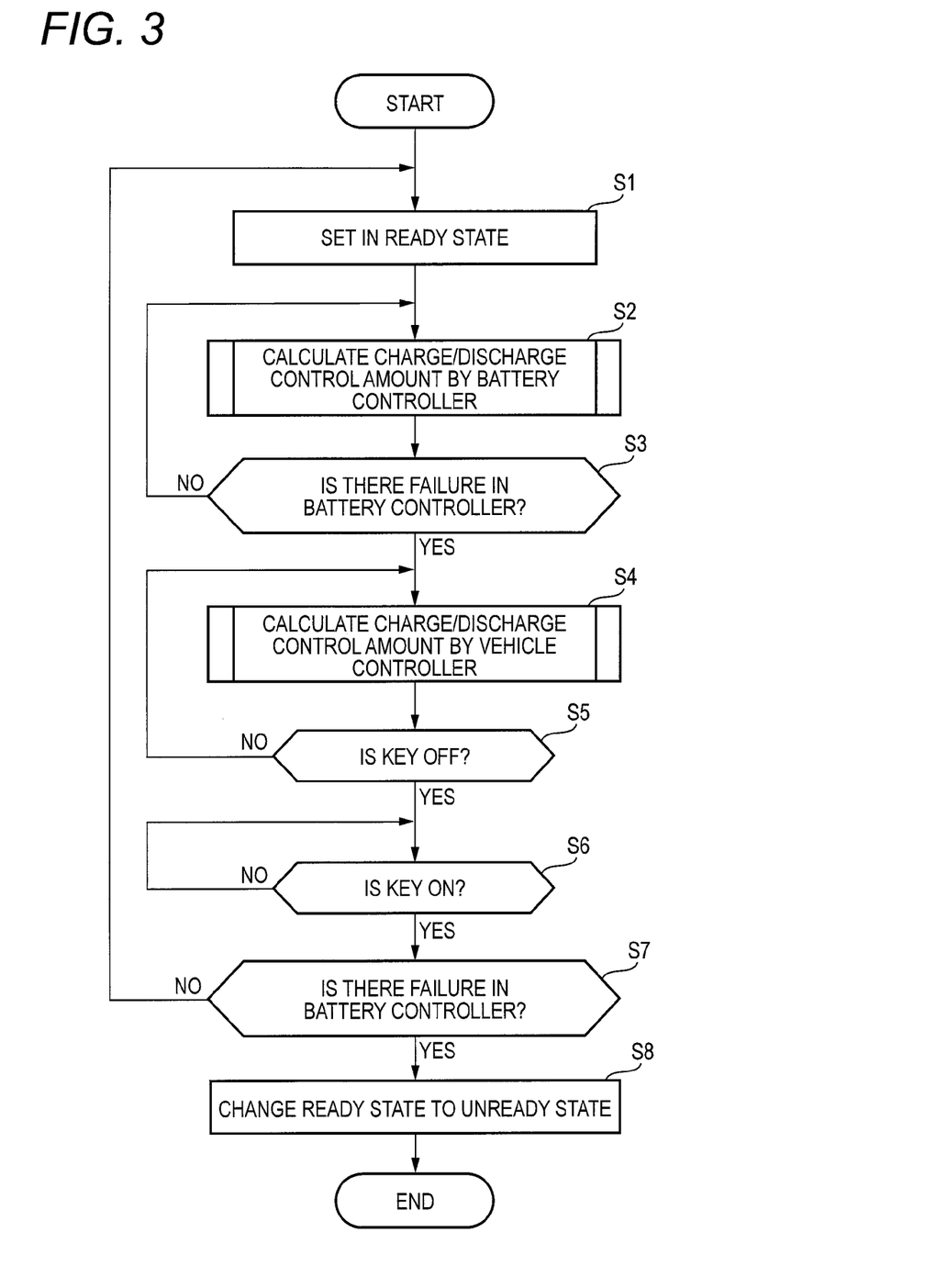
FIG. 3 is a flow chart showing an example of processing for limiting and controlling battery power, which processing is performed by a vehicle controller.

FIG. 3 shows a flow charge of an example of processing for battery power limiting control (also referred to as charge/discharge control) performed by the vehicle controller 20. The contents of processing in each portion of the vehicle controller 20 shown in FIG. 2 will be specifically described below along the processing procedure shown in FIG. 3.

As shown in FIG. 3, first, in Step S1, the READY control portion 21 sets the system of the vehicle in a READY state as soon as a vehicle key is operated.

Next, in Step S2, the charge/discharge control portion 22 makes the battery controller 10 calculate the charge/discharge control amount. Alternatively, the charge/discharge control portion 22 receives the charge/discharge control amount calculated by the battery controller 10. Thus, the charge/discharge control portion 22 can control charge/discharge over the battery pack 8 based on the charge/discharge control amount calculated by the battery controller 10.

Next, in Step S3, the failure determination portion 23 determines whether there is a failure in the battery controller 10 or not. When the failure determination portion 23 determines that there is a failure in the battery controller 10, the processing procedure advances to Step S4. On the contrary, when the failure determination portion 23 determines that there is no failure in the battery controller 10, the processing of the Step S2 is performed.

In Step S4, the charge/discharge control amount calculation portion 30 calculates the charge/discharge control amount individually. Thus, the charge/discharge control portion 22 can control the charge/discharge of the battery pack 8 based on the charge/discharge control amount calculated by the charge/discharge control amount calculation portion 30 of the vehicle controller 20. The processing in which the charge/discharge control amount calculation portion 30 calculates the charge/discharge control amount will be described later in detail.

In Step S5, the charge/discharge control portion 22 determines whether the key is turned OFF or not. When determination is made that the key is turned OFF, the vehicle controller 20 advances to Step S6. On the contrary, when determination is made that the key is not turned OFF, the vehicle controller 20 performs the processing of the Step S4.

In Step S6, the traveling prohibition determination portion 24 determines whether the key is turned ON or not. When determining that the key is turned ON, the traveling prohibition determination portion 24 advances to Step S7.

In Step S7, the traveling prohibition determination portion 24 determines whether there is a failure in the battery controller 10 or not. When determining that there is a failure in the battery controller 10, the traveling prohibition determination portion 24 advances to Step S8. On the contrary, when the traveling prohibition determination portion 24 determines that there is no failure in the battery controller 10, processing is performed again from the Step S1.

In Step S8, the traveling prohibition determination portion 24 changes the READY state to an UNREADY state. That is, the traveling prohibition determination portion 24 prohibits driving the drive motor 6 to thereby prohibit traveling of the vehicle. Then, the traveling prohibition determination portion 24 terminates the processing shown in FIG. 3.

The contents of the processing for battery power limiting control shown in FIG. 3 have been described above.

Next, description will be made on the processing for calculating the charge/discharge control amount in Step S4.

Figure 4:
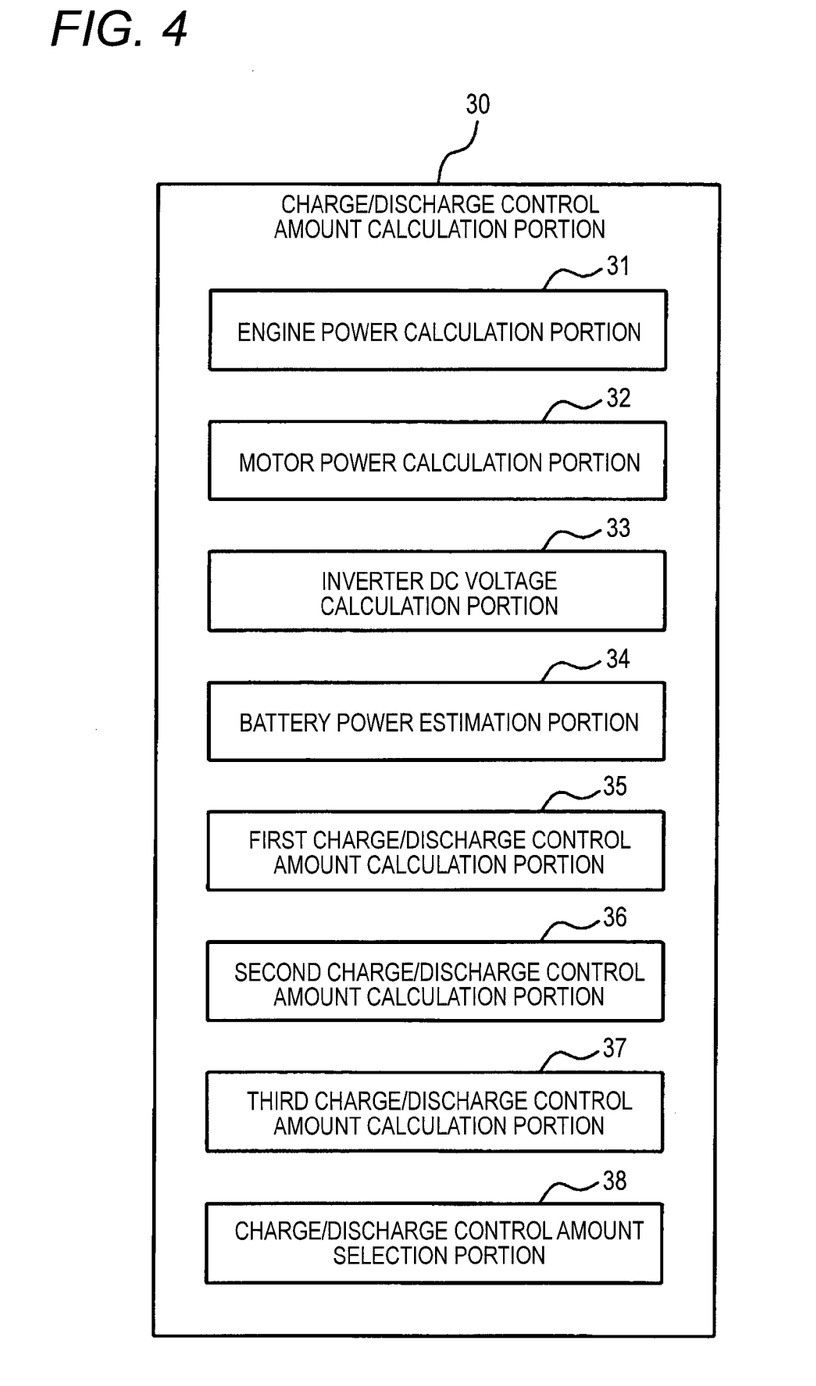
FIG. 4 is a block diagram showing a configuration example of a charge/discharge control amount calculation portion.

FIG. 4 shows a configuration example of the charge/discharge control amount calculation portion 30 for performing the processing for calculating the charge/discharge control amount.

As shown in FIG. 4, the charge/discharge control amount calculation portion 30 has an engine power calculation portion 31, a motor power calculation portion 32, an inverter DC voltage calculation portion 33, a battery power estimation portion 34, first to third charge/discharge control amount calculation portions 35, 36 and 37, and a charge/discharge control amount selection portion 38.

Figure 5:
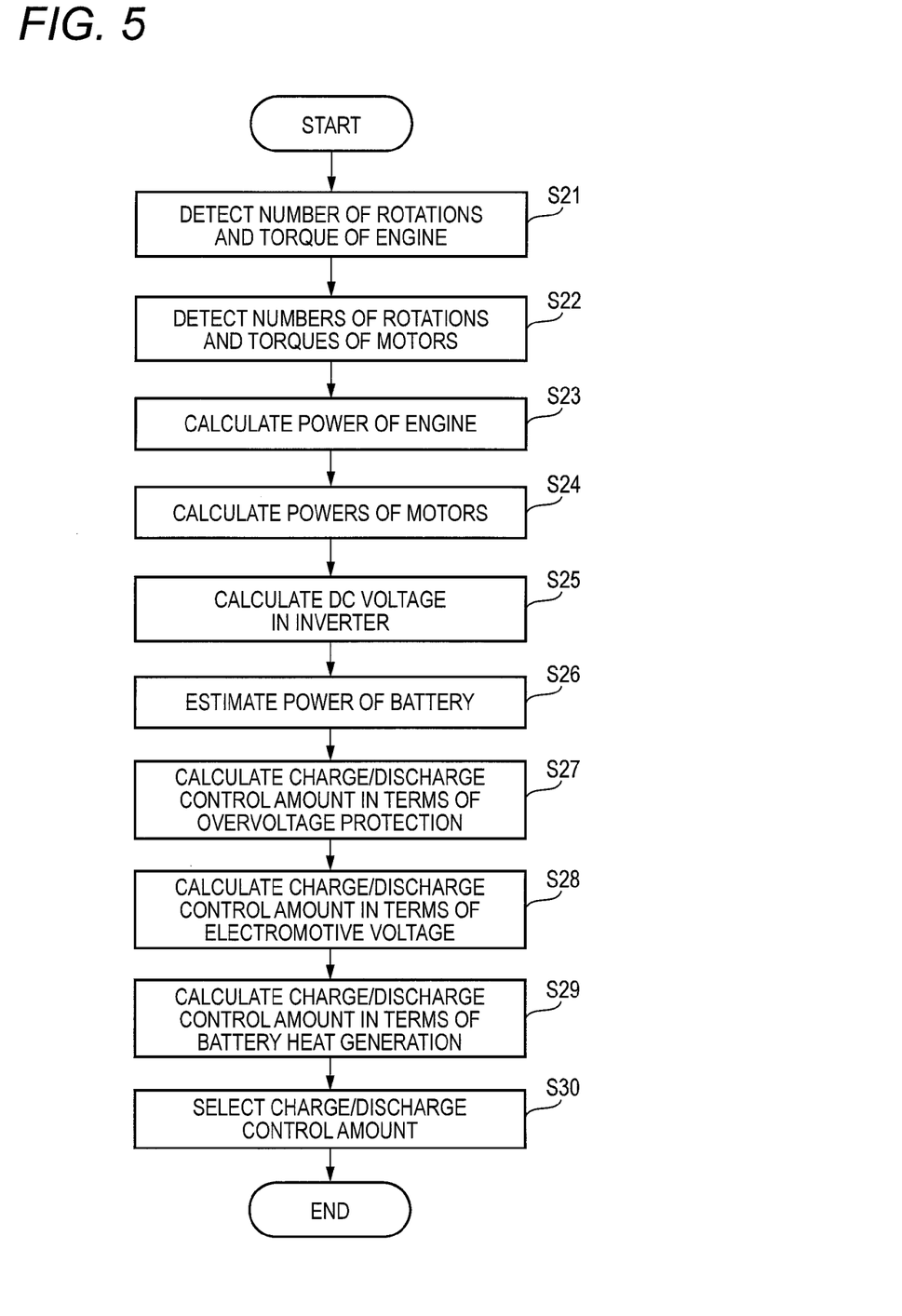
FIG. 5 is a flow chart showing an example of processing for calculating a charge/discharge control amount, which processing is performed by the charge/discharge control amount calculation portion.

In addition, FIG. 5 shows a flow chart of an example of the processing for calculating the charge/discharge control amount in Step S4. The contents of processing in each portion of the charge/discharge control amount calculation portion 30 shown in FIG. 4 will be specifically described below along the processing procedure shown in FIG. 5.

As shown in FIG. 5, first, in Step S21, the engine power calculation portion 31 detects the number of rotations and the torque of the engine 2. For example, the engine power calculation portion 31 calculates the torque of the engine 2 based on the number of rotations of the engine 2 detected by the engine speed sensor 12 and the quantity of fuel injection.

Next, in Step S22, the motor power calculation portion 32 detects the number of rotations and the torque of the power generation motor 5 and the number of rotations and the torque of the drive motor 6 individually. For example, the motor power calculation portion 32 calculates the torque of the power generation motor 5 and the torque of the drive motor 6 based on the number of rotations of the power generation motor 5 and the number of rotations of the drive motor 6 detected by the motor speed sensors 13 and 14 respectively and the current value of an electric current flowing into an element (e.g. an IGBT) in the inverter 7.

Next, in Step S23, the engine power calculation portion 31 calculates power ENP of the engine 2. Specifically, the engine power calculation portion 31 calculates the engine power ENP based on the number of rotations and the torque of the engine 2 detected in the Step S21.

Next, in Step S24, the motor power calculation portion 32 calculates motor power MG2P of the power generation motor 5 and motor power MG1P of the drive motor 6. Specifically, the motor power calculation portion 32 calculates the motor powers MG2P and MG1P based on the numbers of rotations and the torques of the motors 5 and 6 detected in the Step S22 respectively.

The power P of the engine 2 or each motor 5, 6 herein is calculated, for example, by the following Expression (1)

$$P = T \cdot n / 9.549 \tag{1}$$

Here, T designates torque (Nm). On the other hand, n designates the number of rotations (rpm).

Assume that a disc with a radius R (m) receives a force (tangential force) F (N) in the tangential direction of the disc and rotates with the number n of rotations. In this case, the torque T is calculated by the following Expression (2).

$$T = F \cdot R \tag{2}$$

In this case, when S designates a moving distance, the power P is calculated from a workload W as in the following Expression (3) and Expression (4).

$$\begin{aligned}W &= F \cdot S \\ &= F \cdot 2\pi \cdot R \cdot n \\ &= 2\pi \cdot T \cdot n\end{aligned} \tag{3}$$

$$\begin{aligned}P &= (2\pi \cdot T \cdot n)/60\,(s) \\ &= T \cdot n / 9.549\end{aligned} \tag{4}$$

Next, in Step S25, the inverter DC voltage calculation portion 33 calculates a DC voltage value in the inverter 7 (hereinafter referred to as inverter DC voltage value) based on the value detected by the inverter DC voltage sensor 15. The inverter DC voltage value calculated by the inverter DC voltage calculation portion 33 herein takes a value close to the total voltage value of the battery detected by the battery controller 10. For example, the inverter DC voltage value calculated by the inverter DC voltage calculation portion 33 corresponds to a value including an error of about ±5 (V) with respect to the total voltage value of the battery detected by the battery controller 10. The inverter DC voltage calculation portion 33 calculating the inverter DC voltage value in this manner uses the calculated inverter DC voltage value as a substitute for the total voltage value of the battery detected by the battery controller 10. The total voltage value of the battery herein corresponds to the total sum of respective voltages in the battery cells (or battery modules) or the total voltage of the battery pack 8.

Next, in Step S26, the battery power estimation portion 34 estimates battery power. Specifically, the battery power estimation portion 34 estimate battery power BTPs as follows.

(1) In the case of EV traveling (discharge, vehicle speed>0, and ENP=0)

$$BTPs = MG1P \tag{5}$$

In the case of EV traveling, ENP=0 because the engine 2 is in a stop state. Due to ENP=0, the motor power MG2P of the power generation motor 5 is also zero. Accordingly, the battery power BTPs uses the motor power MG1P of the drive motor 6. Thus, the Expression (5) is established.

(2) In the case of engine start (discharge, vehicle speed>0, and ENP<MG2P)

$$BTPs = MG2P \tag{6}$$

In the case of engine start, the engine 2 is started using the power generation motor 5. Accordingly, the motor power MG2P of the power generation motor 5 becomes equivalent to the battery power BTPs. Thus, the Expression (6) is established.

(3) In the case of engine assist (discharge, vehicle speed>0, and MG1P>MG2P)

$$BTPs = MG1P - MG2P \tag{7}$$

In the state of engine assist, the vehicle is traveling by the drive motor 6 driven with electric power from the battery (driven with the motor power MG1P) while the battery is charged with power (motor power MG2P) generated by the engine 2 (power generation motor 5). In this state, the discharge (motor power MG1P) from the battery is therefore larger than the charge (motor power MG2P) using the engine 2 (power generation motor 5). Due to this relationship, the Expression (7) is established.

(4) In the case of power generation (charge, vehicle speed>0, and ENP>MG2P)

$$BTPs = MG2P - MG1P \tag{8}$$

In the state of power generation, the vehicle is traveling by the drive motor 6 driven with electric power from the battery (driven with the motor power MG1P) while the battery is charged with power (motor power MG2P) generated by the engine 2 (power generation motor 5). In this state, the charge (motor power MG2P) using the engine 2 is therefore larger than the discharge (motor power MG1P) from the battery. The operation of power generation is reverse to the operation of engine assist. Due to the aforementioned relationship, the Expression (8) is established.

(5) In the case of regeneration (charge, vehicle speed>0, and MP2P=0)

$$BTPs = MG1P \tag{9}$$

In the case of regeneration, the battery is charged using the drive motor 6. Accordingly, the motor power MG1P of the drive motor 6 becomes equivalent to the battery power BTPs. Thus, the Expression (9) is established.

In the aforementioned manner, the battery power estimation portion 34 estimates the battery power BTPs.

Figure 6:
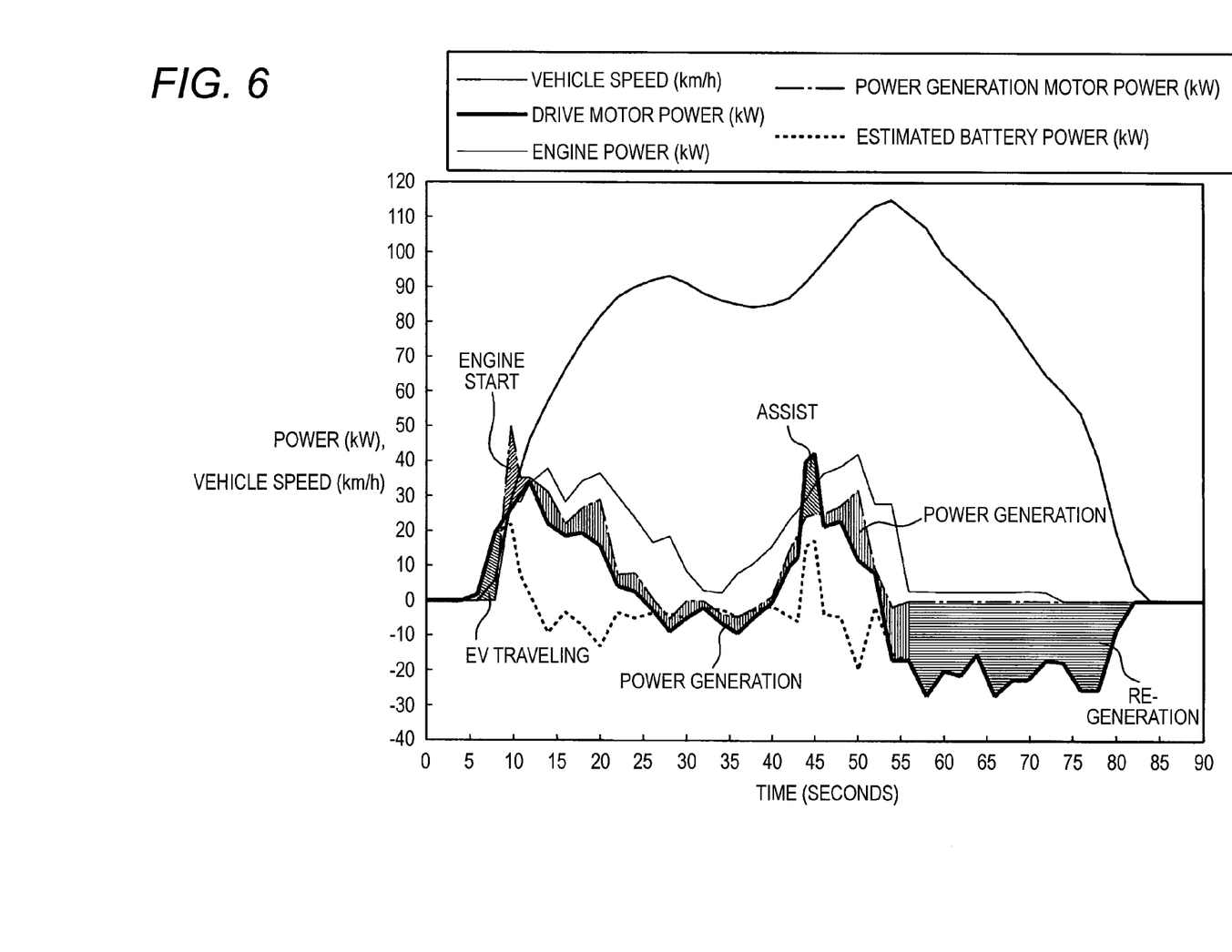
FIG. 6 is a graph showing an example of the relationship among vehicle speed, motor power of a drive motor, motor power of a power generation motor, engine power, and estimated battery power, at the time of EV travelling, at the time of engine start, at the time of engine assist, at the time of power generation, and at the time of regeneration.

FIG. 6 shows an example of the relationship among the vehicle speed, the motor power (power generation motor power) of the power generation motor 5, the motor power (drive motor power) of the drive motor 6, the engine power, and the battery power which is estimated (hereinafter referred to as estimated battery power), at the time of EV traveling, at the time of engine start, at the time of engine assist, at the time of power generation, at the time of regeneration. In addition, the height of the shaded region shown in FIG. 6 corresponds to the estimated engine power. As shown in FIG. 6, the motor powers and the engine power change in accordance with the vehicle state such as engine start, and the estimated battery power changes in accordance therewith.

Next, in Step S28, the first charge/discharge control amount calculation portion 35 calculates the charge/discharge control amount in terms of overvoltage protection. Specifically, the first charge/discharge control amount calculation portion 35 calculates the charge/discharge control amount based on the inverter DC voltage value calculated in the Step S25. For example, the first charge/discharge control amount calculation portion 35 acquires the charge/discharge control amount corresponding to the inverter DC voltage value with reference to a table showing the relationship between the inverter DC voltage value and the charge/discharge control amount.

Figure 7:
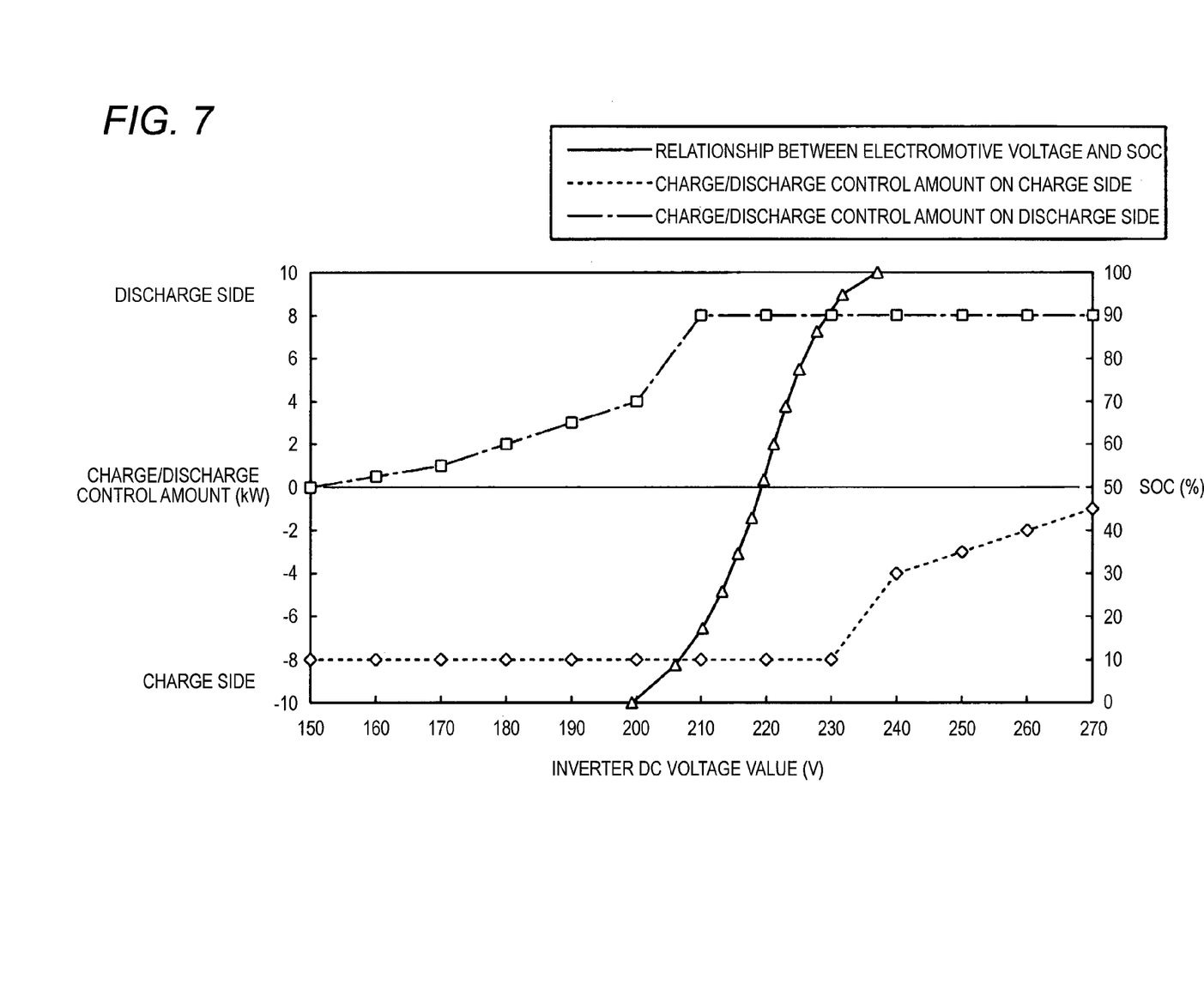
FIG. 7 is a graph showing an example of a table including the relation between an inverter DC voltage value and a charge/discharge control amount.

FIG. 7 shows an example of the table including the relationship between the inverter DC voltage value and the charge/discharge control amount. This table shows the relationship between the inverter DC voltage value and the charge/discharge control amount and the relationship between the electromotive force and the SOC value. The table corresponds to the battery pack 8 of a 200V class, whose lower limit voltage is 150 (V) and whose upper limit voltage is 270 (V).

The first charge/discharge control amount calculation portion 35 acquires the charge/discharge control amount corresponding to the inverter DC voltage value both on the charge side and on the discharge side with reference to the table as shown in FIG. 7. For example, in FIG. 7, the charge/discharge control amount is −8 (kW) on the charge side and the charge/discharge control amount is 8 (kW) on the discharge side when the DC voltage in the inverter 7 is 220 (V).

Next, in Step S29, the second charge/discharge control amount calculation portion 36 calculates the charge/discharge control amount in terms of electromotive voltage. Specifically, the second charge/discharge control amount calculation portion 36 calculates the charge/discharge control amount in the following procedure.

First, the second charge/discharge control amount calculation portion 36 samples the inverter DC voltage value calculated in the Step S25 and the estimated battery power calculated in the Step S26 both at the time of charge and at the time of discharge during traveling. For example, the second charge/discharge control amount calculation portion 36 acquires 20 samples of inverter DC voltage values and 20 samples of estimated battery powers.

The second charge/discharge control amount calculation portion 36 obtains the relationship between the sampled inverter DC voltage values and the sampled estimated battery powers as a linear function by a least-squares method. The second charge/discharge control amount calculation portion 36 sets the intercept of the linear function as the electromotive voltage of the battery pack 8 when the coefficient of determination is at least 0.3.

Figure 8:
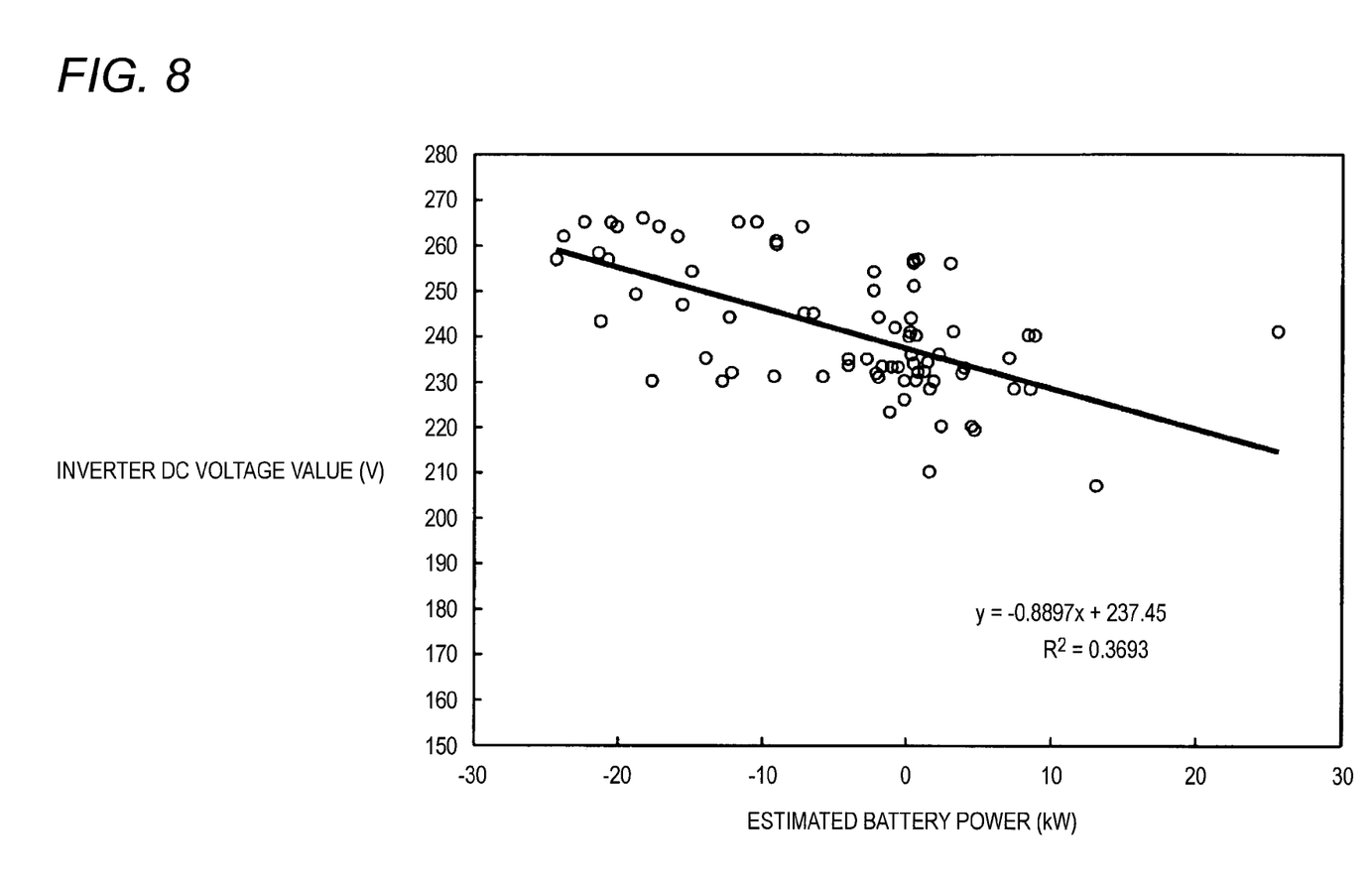
FIG. 8 is a graph showing an example of a linear function obtained by a least-squares method from a plurality of samples for the relation between the inverter DC voltage value and estimated battery power.

FIG. 8 shows an example of the linear function obtained by a least-squares method from the relationship between sampled inverter DC voltage values and sampled estimated battery powers. In FIG. 8, $R^2$ indicates the coefficient of determination.

As shown in FIG. 8, the linear function is expressed by $y=-0.8897x+237.45$, and the coefficient of determination $R^2$ is 0.3693.

The second charge/discharge control amount calculation portion 36 calculates the charge/discharge control amount based on the electromotive voltage acquired in the aforementioned manner. For example, the second charge/discharge control amount calculation portion 36 calculates the charge/discharge control amount with reference to a table or the like.

Figure 9:
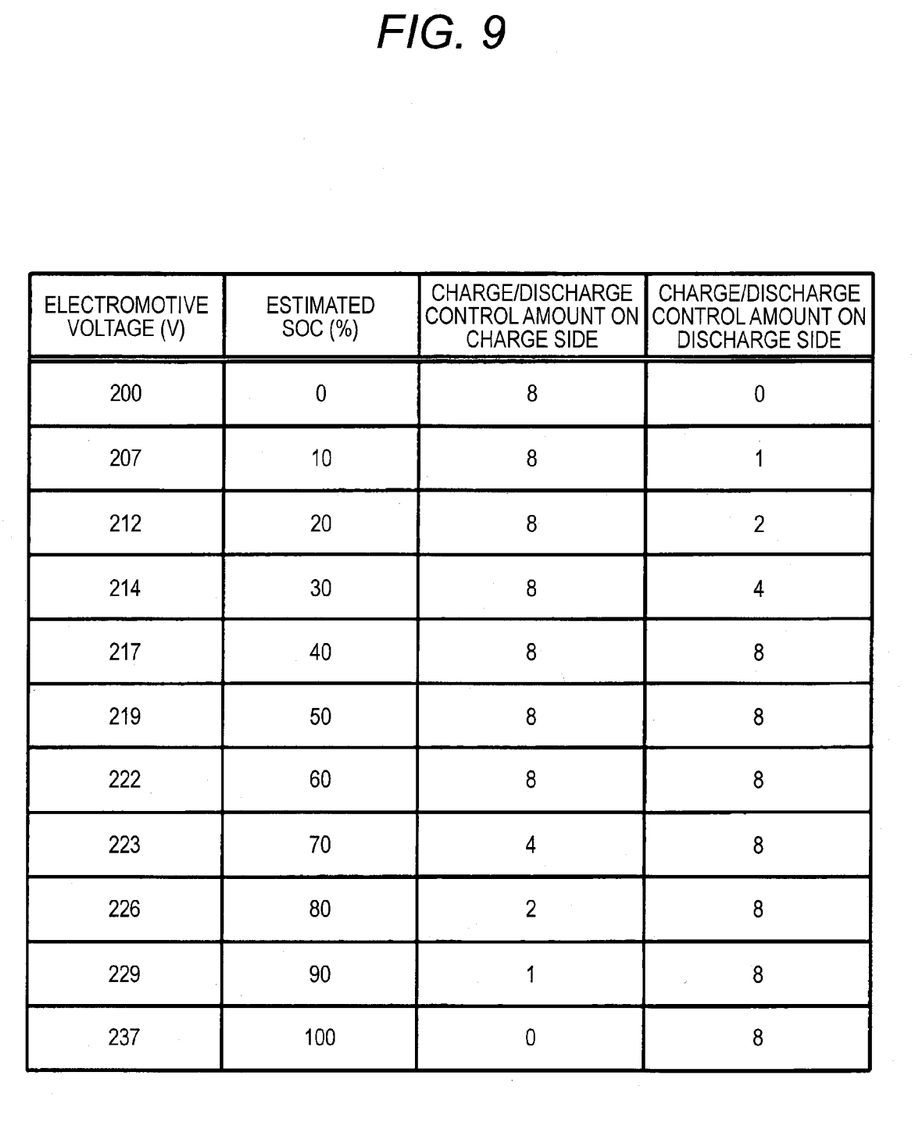
FIG. 9 is a view showing an example of a table including the relation between an electromotive voltage and a charge/discharge control amount.

FIG. 9 shows an example of a table including the relationship between the electromotive voltage and the charge/discharge control amount.

The second charge/discharge control amount calculation portion 36 acquires the charge/discharge control amount corresponding to the electromotive voltage both on the charge side and on the discharge side with reference to the table as shown in FIG. 9.

Next, in Step S29, the third charge/discharge control amount calculation portion 37 calculates the charge/discharge control amount in terms of heat generation of the battery. Specifically, the third charge/discharge control amount calculation portion 37 calculates the charge/discharge control amount in the following procedure.

First, the third charge/discharge control amount calculation portion 37 has information indicating the relationship between the temperature of the battery pack 8 and the current effective value of the battery cooling fan 9 for the battery pack 8 in advance. For example, the information is stored in the storage portion 25 as a table or the like. In addition, in the embodiment, the battery cooling fan 9 is driven by an AC current, and the current value of the AC current changes periodically. The current effective value is a current value in which such an AC current is replaced by a DC current.

With reference to the information stored in the table or the like in advance, the third charge/discharge control amount calculation portion 37 acquires a current effective value corresponding to the temperature of the battery pack 8 estimated when the battery cooling fan 9 is driven in an intermediate drive mode (in which the battery cooling fan 9 is driven to an intermediate degree). The third charge/discharge control amount calculation portion 37 sets the acquired current effective value as the charge/discharge control amount. For example, in the battery pack 8 of a 200V class, the charge/discharge control amount on the charge side is −8 (kW) and the charge/discharge control amount on the discharge side is 8 (kW) when the current effective value is 40 (A).

In the vehicle according to the embodiment, the charge/discharge control of the battery pack 8 or the charge/discharge control amount thereof is designed so that any on-vehicle device such as the battery cooling fan 9 can be driven surely, in the same manner as in a general vehicle. Thus, in the embodiment, the third charge/discharge control amount calculation portion 37 calculates the charge/discharge control amount based on the current value (current effective value) for driving the battery cooling fan 9.

In Step S30, the charge/discharge control amount selection portion 38 selects the smallest value of the charge/discharge control amounts on the discharge side calculated by the processing of the Steps S27 to S29. Further, the charge/discharge control amount selection portion 38 selects the smallest value (smallest in absolute value) of the charge/discharge control amounts on the charge side calculated by the processing of the Steps S27 to S29.

The contents of the charge/discharge control amount calculating process shown in FIG. 5 have been described above. (Operation, Effect, etc.)

Next, a series of operations of the vehicle controller 20, the effect thereof, etc. will be described by way of example.

As soon as the vehicle key is operated, the vehicle controller 20 sets the system of the vehicle in a READY state (the Step S1). As long as a failure is not detected in the battery controller 10, the vehicle controller 20 makes the battery controller 10 calculate the charge/discharge control amount and performs charge/discharge control of the battery pack 8 based on the calculated charge/discharge control amount (the Steps S2 and S3).

When a failure is detected in the battery controller 10, the vehicle controller 20 itself calculates the charge/discharge control amount and performs charge/discharge control of the battery pack 8 based on the calculated charge/discharge control amount (the Step S4).

When no failure is detected in the battery controller 10 after the key is operated from OFF to ON (the Steps S5 and S6), the vehicle controller 20 makes the battery controller 10 calculate the charge/discharge control amount and performs charge/discharge control of the battery pack 8 based on the calculated charge/discharge control amount (from the Step S7 to the Steps S1 and S2). On the other hand, when a failure is detected in the battery controller 10 again after the key is operated from OFF to ON, the vehicle controller 20 changes the READY state to an UNREADY state (the Steps S5 to S8).

The vehicle controller 20 herein calculates the charge/discharge control amount in the following manner (FIG. 5).

The vehicle controller 20 detects the number of rotations and the torque of the engine 2, and detects the numbers of rotations and the torques of the power generation motor 5 and the drive motor 6 respectively (the Steps S21 and S22). The vehicle controller 20 calculates the power ENP of the engine 2 based on the detected number of rotations and the detected torque of the engine 2 (the Step S23). Further, the vehicle controller 20 calculates the motor powers MG2P and MG1P of the power generation motor 5 and the drive motor 6 respectively based on the detected numbers of rotations and the detected torques of the power generation motor 5 and the drive motor 6 (the Step S24). On the other hand, the vehicle controller 20 calculates the inverter DC voltage value (the Step S25).

The vehicle controller 20 then calculates the estimated battery power BTPs corresponding to the vehicle state such as EV traveling, using the calculated engine power ENP and the calculated motor powers of the respective motors (the Step S26).

In addition, the vehicle controller 20 calculates the charge/discharge control amounts in terms of overvoltage protection, electromotive voltage, and battery heat generation, respectively (the Steps S27 to S29). The vehicle controller 20 then selects the smallest value (smallest in absolute value) of the calculated charge/discharge control amounts (the Step S30).

In the aforementioned embodiment, the battery controller 10 constitutes, for example, a battery control portion. On the other hand, the vehicle controller 20 constitutes, for example, a vehicle control portion. In addition, the inverter DC voltage sensor 15 and the inverter DC voltage calculation portion 33 constitute, for example, an inverter driving state detection portion. In addition, the first to third charge/discharge control amount calculation portions 35 to 37 constitute first to third failure-time discharge control amount calculation portions respectively.

(Modifications etc. of the Embodiment)

In the embodiment, the charge/discharge control portion 22 may avoid charge/discharge control of the battery pack 8 when determination is made that there is a failure. For example, the charge/discharge control portion 22 has communication with the battery controller 10 in a normal state (in which there is no failure in the battery controller 10) and obtains values as to items relating to a failure. For example, the items relating to a failure herein include variation in voltage among cells (or modules) of the battery pack 8, variation in battery temperature, over-rising of battery temperature, battery temperature, etc. The charge/discharge control portion 22 determines whether there is a failure or not based on the values of such items relating to a failure. When determining that there is a failure, the charge/discharge control portion 22 avoids charge/discharge control of the battery pack 8.

The charge/discharge control portion 22 may perform such failure determination when there is a failure in the battery controller 10. Specifically, the charge/discharge control portion 22 holds the values immediately before the failure appears in the battery controller 10. In particular, the charge/discharge control portion 22 stores the values of the communication items into the storage portion 25 successively at predetermined timing. Based on the values obtained thus immediately before the failure appears in the battery controller 10, the charge/discharge control portion 22 determines whether there is a failure or not. When determining that there is a failure, the charge/discharge control portion 22 avoids charge/discharge control of the battery pack 8. For example, the charge/discharge control portion 22 changes the READY state to an UNREADY state so as to avoid the battery charge/discharge control.

In addition, in the embodiment, the charge/discharge control amount calculation portion 30 may have at least two of the first to third charge/discharge control amount calculation portions 35 to 37, and the charge/discharge control amount selection portion 38 may select one charge/discharge control amount whose absolute value is the smallest, from the charge/discharge control amounts calculated by the two charge/discharge control amount calculation portions.

In the embodiment, the charge/discharge control amount calculation portion 30 may have only one of the first to third charge/discharge control amount calculation portions 35 to 37, and instead of selecting a charge/discharge control amount by the charge/discharge control amount selection portion 38, a charge/discharge control amount calculated by the one of the first to third charge/discharge control amount calculation portions 35 to 37 may be adopted as a charge/discharge control amount in case a failure is detected in the battery controller 10.

Although the embodiment of the invention has been described specifically, the scope of the invention is not limited to the illustrative embodiment shown in the drawings and description but may include all embodiments which can bring equivalent effects to the effects the invention is aimed at. Further, the scope of the invention is not limited to combination of characteristics of the invention described in Claims but may be described in accordance with any desired combination of specific characteristics selected from all the disclosed characteristics.

What is claimed is:

1. A battery charge/discharge control apparatus for controlling charge/discharge of a battery in a vehicle comprising the battery serving as a motive power source for driving the vehicle, an inverter which performs conversion between a DC current and an AC current, a motor which transfers electric power to the battery through the inverter or from which electric power is transferred from the battery through the inverter, the battery charge/discharge control apparatus comprising:

at least one central processing unit configured to operate as a battery control portion, a vehicle control portion, a failure determination portion and an inverter driving state detection portion; and wherein:
the battery control portion controls charge/discharge of the battery;
the vehicle control portion controls the inverter and controls the charge/discharge of the battery based on information from the battery control portion;
the failure determination portion determines whether there is a failure in the battery control portion or not;
the inverter driving state detection portion detects a driving state of the inverter;
the vehicle control portion controls the charge/discharge of the battery based on the driving state of the inverter detected by the inverter driving state detection portion when the failure determination portion determines that there is a failure in the battery control portion;
the battery control portion outputs, to the vehicle control portion, a charge/discharge control amount for controlling the charge/discharge of the battery; and
the battery charge/discharge control apparatus further comprising:
a storage portion which stores a relationship between the driving state of the inverter and the charge/discharge control amount;
wherein the at least one central processing unit further operates as a failure-time discharge control amount calculation portion which calculates the charge/discharge control amount based on the driving state of the inverter, which is detected by the inverter driving state detection portion and by referring to the relationship between the driving state of the inverter and the charge/discharge control amount stored in the storage portion, and
the vehicle control portion controls the charge/discharge of the battery based on the charge/discharge control amount supplied from the battery control portion when the failure determination portion determines that there is no failure in the battery control portion, and controls the charge/discharge of the battery based on the charge/discharge control amount calculated by the failure-time discharge control amount calculation portion when the failure determination portion determines that there is a failure in the battery control portion.

2. The battery charge/discharge control apparatus according to claim 1, wherein:
traveling of the vehicle is started and terminated by turning ON and OFF a power supply; and
the at least one central processing unit further operates as a vehicle prohibition determination portion which prohibits the drive motor from being driven so as to prohibit the vehicle from traveling when the failure determination portion determines that there is a failure in the battery control portion as soon as the power supply is turned from OFF to ON.

3. The battery charge/discharge control apparatus according to claim 1, wherein:
the storage portion stores a table including the relationship between the driving state of the inverter and the charge/discharge control amount, and the failure-time discharge control amount calculation portion calculates the charge/discharge control amount by referring to the table.

4. A battery charge/discharge control apparatus for controlling charge/discharge of a battery in a vehicle comprising the battery serving as a motive power source for driving the vehicle, an inverter which performs conversion between a DC current and an AC current, a motor which transfers electric power to the battery through the inverter or from which electric power is transferred from the battery through the inverter, the battery charge/discharge control apparatus comprising:
at least one central processing unit configured to operate as a battery control portion, a vehicle control portion, a failure determination portion and an inverter driving state detection portion; and
wherein:
the battery control portion controls charge/discharge of the battery;
the vehicle control portion controls the inverter and controls the charge/discharge of the battery based on information from the battery control portion;
the failure determination portion determines whether there is a failure in the battery control portion or not; and
the inverter driving state detection portion detects a driving state of the inverter; wherein:
the vehicle control portion controls the charge/discharge of the battery based on the driving state of the inverter detected by the inverter driving state detection portion when the failure determination portion determines that there is a failure in the battery control portion;
the battery control portion outputs, to the vehicle control portion, a charge/discharge control amount for controlling the charge/discharge of the battery;
the battery charge/discharge control apparatus further comprises a charge/discharge amount estimation portion which estimates a charge/discharge amount of the battery from driving state of the motor, an electromotive voltage calculation portion which calculates an electromotive voltage of the battery based on the charge/discharge amount of the battery estimated by the charge/discharge amount estimation portion and a voltage value of a current flowing in the inverter, which value is detected by the inverter driving state detection portion, and a failure-time discharge control amount calculation portion which calculates the charge/discharge control amount based on the electromotive voltage calculated by the electromotive voltage calculation portion; and
the vehicle control portion controls the charge/discharge of the battery based on the charge/discharge control amount supplied from the battery control portion when the failure determination portion determines that there is no failure in the battery control portion, and controls the charge/discharge of the battery based on the charge/discharge control amount calculated by the failure-time discharge control amount calculation portion when the failure determination portion determines that there is a failure in the battery control portion.

5. The battery charge/discharge control apparatus according to claim 4, wherein:
traveling of the vehicle is started and terminated by turning ON and OFF a power supply; and
the the at least one central processing unit further operates as a vehicle prohibition determination portion which prohibits the drive motor from being driven so as to prohibit the vehicle from traveling when the failure determination portion determines that there is a failure in the battery control portion as soon as the power supply is turned from OFF to ON.

6. A battery charge/discharge control apparatus for controlling charge/discharge of a battery in a vehicle comprising the battery serving as a motive power source for driving the vehicle, an inverter which performs conversion between a DC current and an AC current, a motor which transfers electric power to the battery through the inverter or from which electric power is transferred from the battery through the inverter, the battery charge/discharge control apparatus comprising:

at least one central processing unit configured to operate as a battery control portion, a vehicle control portion, a failure determination portion and an inverter driving state detection portion; and wherein:

the battery control portion controls charge/discharge of the battery;

the vehicle control portion controls the inverter and controls the charge/discharge of the battery based on information from the battery control portion;

the failure determination portion determines whether there is a failure in the battery control portion or not; and the inverter driving state detection portion detects a driving state of the inverter; wherein:

the vehicle control portion controls the charge/discharge of the battery based on the driving state of the inverter detected by the inverter driving state detection portion when the failure determination portion determines that there is a failure in the battery control portion;

the battery control portion outputs, to the vehicle control portion, a charge/discharge control amount for controlling the charge/discharge of the battery;

the battery charge/discharge control apparatus further comprises a storage portion storing information in which a current value of a current supplied from the battery in order to drive a cooling fan of the battery has been associated with a temperature of the battery, and a failure-time discharge control amount calculation portion which refers to the information stored in the storage portion to acquire the current value corresponding to a temperature of the battery estimated when the cooling fan is driven in a predetermined driving state and which calculates the charge/discharge control amount based on the acquired current value; and the vehicle control portion controls the charge/discharge of the battery based on the charge/discharge control amount supplied from the battery control portion when the failure determination portion determines that there is no failure in the battery control portion, and controls the charge/discharge of the battery based on the charge/discharge control amount calculated by the failure-time discharge control amount calculation portion when the failure determination portion determines that there is a failure in the battery control portion.

7. The battery charge/discharge control apparatus according to claim 6, wherein:

traveling of the vehicle is started and terminated by turning ON and OFF a power supply; and the at least one central processing unit further operates as a vehicle prohibition determination portion which prohibits the drive motor from being driven so as to prohibit the vehicle from traveling when the failure determination portion determines that there is a failure in the battery control portion as soon as the power supply is turned from OFF to ON.

* * * * *